US008730916B2

(12) United States Patent  
Xie

(10) Patent No.: US 8,730,916 B2  
(45) Date of Patent: May 20, 2014

(54) METHOD FOR REALIZING SINGLE RADIO VOICE CALL CONTINUITY AND SINGLE RADIO VOICE CALL CONTINUITY SYSTEM

(75) Inventor: Zhenhua Xie, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 407 days.

(21) Appl. No.: 13/257,971

(22) PCT Filed: May 21, 2010

(86) PCT No.: PCT/CN2010/073073  
§ 371 (c)(1),  
(2), (4) Date: Nov. 15, 2011

(87) PCT Pub. No.: WO2010/133185  
PCT Pub. Date: Nov. 25, 2010

(65) Prior Publication Data  
US 2012/0269164 A1    Oct. 25, 2012

(30) Foreign Application Priority Data

May 22, 2009 (CN) .......................... 2009 1 0202930

(51) Int. Cl.  
*H04W 36/14* (2009.01)

(52) U.S. Cl.  
USPC ........................................................ 370/331

(58) Field of Classification Search  
CPC .................................................... H04W 36/14  
See application file for complete search history.

(56) References Cited

U.S. PATENT DOCUMENTS

2010/0061337 A1*  3/2010  Hallenstal et al. ............. 370/331  
2011/0274090 A1* 11/2011  Hallensal et al. .............. 370/331

FOREIGN PATENT DOCUMENTS

| CN | 101052161 A | 10/2007 |
| CN | 101291453 A | 10/2008 |
| CN | 101291537 A | 10/2008 |
| WO | 2008125329 A1 | 10/2008 |

OTHER PUBLICATIONS

R2-082474, 3GPP TSG-RAN WG2 #62, May 5-9, 2008, Kansas City, MO, USA, see pp. 2-8.  
International Search Report for PCT/CN2010/073073 dated Aug. 2, 2010.

* cited by examiner

*Primary Examiner* — Sulaiman Nooristany  
(74) *Attorney, Agent, or Firm* — Ling Wu; Stephen Yang; Ling and Yang Intellectual Property

(57) ABSTRACT

A method for implementing single radio voice call continuity, comprises: User Equipment (UE) establishing an IP Multimedia Core Network Subsystem (IMS) session with a remote user through a Packet Switch (PS) network, wherein the IMS session is anchored to an enhanced Mobile Switch Center (eMSC); the PS network sending a handover request to the eMSC for handing over the IMS session to gain access through a Circuit Switch (CS) network; the eMSC receiving the handover request, establishing a media link, and relating a newly established media link with a remote media link of the IMS session, so that the UE can communicate with the remote user through the newly established media link and the remote media link. The present invention also provides a system and an eMSC for supporting single radio voice call continuity.

12 Claims, 6 Drawing Sheets

METHOD FOR REALIZING SINGLE RADIO VOICE CALL CONTINUITY AND SINGLE RADIO VOICE CALL CONTINUITY SYSTEM

TECHNICAL FIELD

The present invention relates to the field of communication, and more especially, to a method for realizing single radio voice call continuity and single radio voice call continuity supported system.

BACKGROUND OF THE RELATED ART

IP multimedia core network subsystem (IMS) is an IP-based network architecture proposed by the $3^{rd}$ generation partnership project (3GPP), and it constructs an open and flexible service environment to support multimedia applications and provides users with enriched multimedia services.

In the IMS service system, the control layer and the service layer are with separated, and the control layer only provides the service layer with necessary functions such as triggering, routing and charging rather than specific services.

The functions of service triggering and controlling in the control layer are implemented by the call session control function (CSCF). There are three kinds of CSCFs: proxy-CSCF (P-CSCF), Interrogating-CSCF (I-CSCF) and Serving-CSCF (S-CSCF), wherein S-CSCF takes the main responsibility, and the I-CSCF is an optional network element.

The service layer consists of a series of application servers (AS) to provide specific services, and the AS can be an individual entity or exist in the S-CSCF.

According to the user's contract information, the S-CSCF of the control layer controls the service triggering, calls the services in the AS, and implements the service function. The AS and S-CSCF can be collectively called service equipment (SE).

The end-to-end equipment in the session is called user equipment (UE) and is in charge of the interaction with the users; some UEs can access the network by a variety of methods including accessing the network via the 3GPP packet switch (PS) domain, accessing the network via other non-3GPP PS domain and even accessing the network via the circuit switch (CS) domain.

If the CS network is configured with an enhanced mobile switch center (eMSC), the eMSC provides a session initial protocol (SIP) interface to interact with the IMS network, then the interaction between the IMS network and the CS network can be implemented via the eMSC.

For a UE having a variety of access methods, if the UE can use only one access method at a certain time, and it is performing a certain service such as a call with a certain access method, the UE and the network can provide a certain method not to interrupt the service being performed by the UE when the UE moves to other domains and needs to change the access method in use, and this capability is called single terminal radio voice call continuity, simplified as single radio voice call continuity (SRVCC).

FIG. 1 is a schematic diagram of the SRVCC, and it describes the signaling leg and media leg for establishing a session between the single radio voice call terminal UE-1 and the IMS terminal UE-2, and the signaling leg and media leg between the UE-1 and the UE-2 after the SRVCC happens, and to simplify the illustration and description, the S-CSCF and service continuity AS (SC AS) are combined as one entity and between them, the SIP based on IMS standard is used for communication.

Before the SRVCC happens, a session is established between the UE-1 and the UE-2, whose signaling legs are described as follows:

A102: the signaling leg between the UE-1 and the P-CSCF which communicate with each other via the SIP of the IMS; for the SC AS, this belongs to the access leg;

A104: the signaling leg between the P-CSCF and the SC AS/S-CSCF that communicate with each other via the SIP of the IMS; for the SC AS, this also belongs to the access leg;

R101: the signaling leg between the SC AS/S-CSCF and the UE-2 that communicate with each other via the SIP of the IMS, and for the SC AS, this is a remote leg;

After the SRVCC happens, both the signaling leg and the media leg between the UE-1 and the UE-2 change, wherein, the change of the signaling leg is described as follows:

A112: the signaling leg between the UE-1 and the eMSC that communicate with each other via signaling protocol of the CS domain, and for the SC AS, this is an access leg;

A114: the signaling leg between the eMSC and the SC AS/S-CSCF that communicate with each other via the SIP of the IMS, and for the SC AS, this also belongs to the access leg;

R101: the signaling leg between the SC AS/S-CSCF and the UE-2 that communicate with each other via the SIP of the IMS, and for the SC AS, this is a remote leg, and this remote leg does not change after the SRVCC happens.

FIG. 2 is an architecture diagram of the existing SRVCC, and it describes each related part in the network or each network element participating in the implementation of the SRVCC, as well as the interfaces or the connection relationship between them, and the description is as follows:

Description of the related network elements:

UE: user terminal equipment having SRVCC capability;

CS network: a network providing users with the conventional CS services;

PS network: a network providing users with the PS services;

eMSC: processing the handover request sent by the PS network, performing the inter-domain transfer of the session, relating the CS handover operation with the inter-domain transfer operation and so on;

IMS network: a network providing users with the IMS services.

Description of the related interfaces:

S202: the air interface between the UE and the CS network (briefly called the CS air interface) which is used to implement information interaction between the UE and the CS network, such as the standard Um interface;

S204: the air interface between the UE and the PS network (briefly called the PS air interface) which is used to implement information interaction between the UE and the PS network, such as the standard Uu interface;

S206: the interface between the CS network and the eMSC (also called the CS signaling interface) is different according to different network element which is specifically connected, and the interface between the eMSC and the base station subsystem is the standard Iu-CS interface, and the interface between the eMSC and other mobile switch centers is a standard interoffice signaling interface, that is, the E interface or the Nc interface;

S208: the signaling interface between the PS network and the eMSC (also called the inter-domain handover signaling interface) is to provide inter-domain handover support, and this interface is the standard Sv interface;

S210: the signaling interface between the PS network and the Internet, such as the standard SGi interface, this interface provides IP data bearer for the information interaction between the UE and the Internet, and since the IMS network is based on the Internet, it can be considered as a special kind of Internet;

S212: the signaling leg between the eMSC and the IMS network, it might be the standard I2 interface based on the SIP of the IMS between the eMSC and the IMS network, or consist of the standard Nc interface between the eMSC and the media gateway and the standard Mg interface between the media gateway and the IMS network which are connected; if it is the latter, the media gateway will translates the message at the Nc interface into the SIP message of the IMS, or vise versa; the Nc interface can be based on the SIP (Nc-SIP) or the ISDN user protocol (ISUP) (Nc-ISUP). Although both the Nc-SIP and the I2 interface are based on the SIP, the protocol only specifies the message format, and the message content depends on applications, and using I2 interface indicates that the eMSC supports the IMS related applications, while using Nc-SIP interface indicates that the eMSC supports the conventional CS related applications.

FIG. 3 is a flow chart of the method for implementing the existing SRVCC, and it describes that an IMS session is established between the UE-1 and the UE-2 so that an IMS media leg is established, and the IMS media leg consists of the media leg between the UE-1 and the PS network and the media leg between the PS network and the UE-2, and after the SRVCC happens in the UE-1, the UE-1 and the network implementation let the UE-1 use the CS domain to establish a media leg and maintain the process of original session continuity, the process comprises the following steps:

Step 301: the UE-1 sends a measurement report to the PS network that serves it via the S204 interface to the PS network, thus to report the signal intensity measurement information of the cells;

Step 302: according to the signal intensity information of each cell in the measurement report, the PS network (original PS network) that serves the UE-1 judges that the nearby CS network is more suitable to serve the UE-1, and then decides to perform handover operation;

Step 303: the corresponding network element in the original PS network, such as the mobile management entity (MME), sends a handover request to the eMSC via the S208 interface between the PS network and the eMSC, such as sending a handover request message which carries the number information of the UE-1 and the number information of the SC AS used for identifying the radio voice call continuity request and acquired by the PS network via the home subscriber server (HSS);

Step 304: the eMSC performs the standard CS handover procedure to prepare the media link resources of the target CS network;

Step 305: after completing the CS handover procedure, the eMSC sends a handover response message to the PS network via the S208 interface, such as sending a handover response message;

Step 306: after the PS network receives the handover response message, it sends a handover command message to the UE-1 via the S204 interface to notify the UE-1 to hand over to the CS domain;

Step 307: after the UE-1 receives the handover command message, it tunes the access method to access via the CS domain;

until now, a CS media leg is established between the UE-1 and the eMSC, and this media leg consists of the CS media leg between the UE-1 and the CS network and the CS media leg between the CS network and the eMSC.

The following steps follows step 303, and they have no order relationship with steps 304~307.

Step 308: after the eMSC receives the handover request message sent from the PS network, it sends a call request to the SC AS;

the abovementioned call request is sent via the signaling leg of S212 (called interconnected signaling leg), therefore, it can be a SIP INVITE message or a ISUP initial address message (IAM); this call request carries the number information of the UE-1 and the number information of the SC AS, wherein, the number information of the SC AS is the called information, and the number information of the UE-1 is the calling information.

Step 309: the SC AS finally receives the SIP INVITE message of the IMS forwarded by the CSCF, and the SC AS judges that this is one service continuity request according to the called information, and searches out the call in process that is related to this call according to the calling information;

Step 310: the SC AS sends an IMS update request to the UE-2 via the CSCF on the signaling leg of the related call in process, such as sending an UPDATE or a reINVITE message;

Step 311: After the UE-2 receives the update request, it responds a update agreeing message, such as a "200 OK" message;

Step 312: After the SC AS receives the update agreeing message forwarded from the CSCF, it sends a call response message, such as a "200 OK" message, to the eMSC via the signaling leg of S212, and what the eMSC finally receives might be the "200 OK" message of SIP or the answer message (ANM) of ISUP;

until now, a new media leg is established between the eMSC and the UE-2, and the eMSC connects the newly established media leg with the CS media leg so as to make the UE-1 continuously communicate with the UE-2.

SUMMARY OF THE INVENTION

From the abovementioned content, it can be seen that since the SC AS configured in the home network does not perform the anchoring of the media leg, it needs to perform update operation on the remote users in steps 310~311 when applying the existing method for implementing the SRVCC, however, the transferring delay of the IMS signaling which performs the update operation is relatively large, thus it still needs to wait for a relatively long time to have the new media leg established after the establishment of the CS media, thus the interruption duration in the call is too long.

The technical problem to be solved by the present invention is to provide a method for implementing SRVCC which does not need to update the media of the remote user and a SRVCC system in order to overcome technical deficiency.

In order to solve the abovementioned problem, the present invention provides a method for implementing SRVCC, and the method comprises:

user equipment (UE) establishes an IP Multimedia Core Network Subsystem (IMS) session with a remote user via a packet switch (PS), and the IMS session is anchored to an enhanced mobile switch center (eMSC);

the PS network sends a handover request to the eMSC for handing over said IMS session to gain access via a circuit switch (CS) network; and said eMSC receives said handover request, establishes a media link, and relates the newly established media link with the remote media link of said IMS session, so that the UE can communicate with the remote user via the newly established media link and said remote media link.

After the step of receiving said handover request, said method also comprises: said eMSC sends a map request to an access gateway (AGW), and said map request carries a line number L1 of line resources used by a target mobile switch center (MSC) to transmit CS media in the newly established media link; and said AGW receives said map request, and relates the line number L1 with said remote media link, and allocates a line number L2 of the line resources that are used for transmitting the CS media between the target MSC and the remote user in the newly established media link, and sends said line number L2 to said eMSC via a map response.

After the step of receiving said handover request, said method also comprises:

Said eMSC sends a line allocation request to the AGW, and the line allocation request carries the line number L1 of the line resources used by the target MSC to transmit the CS media in the newly established media link; and said AGW receives said line allocation request and returns a line allocation response to the eMSC, and said line allocation response carries the line number L2 of the line resources which are used for transmitting the CS media between the target MSC and the remote user in said newly established media link.

Said method also comprises: said eMSC receives said line allocation response, and the eMSC sends the map request to the AGW to request said AGW to connect the newly established media link with the remote media link.

Said map request carries said line number L1 or L2.

In order to solve the abovementioned problem, the present invention also provides a system for supporting SRVCC, and the system comprises: a packet switch (PS) network, a circuit switch (CS) network, and an enhanced mobile switch center (eMSC); wherein:

said PS network is configured to: send a handover request to the eMSC to request the IP Multimedia Core Network Subsystem (IMS) session to be handed over to gain access via said CS network; wherein, said IMS session is a session established by the UE with the remote user via the PS network, and the session is anchored to the eMSC; and said eMSC is configured to: receive said handover request, establish a media link, and relate the newly established media link with the remote media link of the IMS session, so as to make the UE communicate with the remote user via said newly established media link and said remote media link.

Said system also comprises an AGW; wherein:

said eMSC is also configured to: after receiving said handover request, send a map request to said AGW, and said map request carries the line number L1 of the line resources used by the target MSC to transmit the CS media in the newly established media link; and said AGW is configured to: receive said map request, relate said line number L1 with said remote media link, and allocate the line number L2 of the line resources which are used for transmitting the CS media between the target MSC and the remote user in said newly established media link, and send said line number L2 to the eMSC via a map response.

Said system also comprises an AGW; wherein:

said eMSC is also configured to: after receiving said handover request, send a line allocation request to said AGW, and said line allocation request carries the line number L1 of the line resources used by the target MSC to transmit the CS media in the newly established media link; and Said AGW is configured to: receive said line allocation request, and return a line allocation response to the eMSC, and said line allocation response carries the line number L2 of the line resources which are used for transmitting the CS media between the target MSC and the remote user in said newly established media link.

Said eMSC is also configured to: after receiving said line allocation response, send a map request to the AGW to request said AGW to connect said newly established media link with the remote media link.

Said map request carries said line number L1 or L2.

In order to solve the abovementioned problem, the present invention also provides an enhanced mobile switch center (eMSC) for supporting single radio voice call continuity (SRVCC), and the eMSC comprises:

a receiving module, which is configured to: receive a handover request sent by a packet switch (PS) network to the eMSC to request a IP Multimedia Core Network Subsystem (IMS) session to be handed over to gain access via said CS network, and send said handover request to a link establishment module; wherein, said IMS session is a session established by user equipment (UE) with a remote user via said PS network and anchored to the eMSC; and a link establishment module, which is configured to: establish a media link, and relate a newly established media link with a remote media link of said IMS session, and make the UE communicate with the remote user via said newly established media link and said remote media link.

Said eMSC also comprises a sending module, wherein:

the sending module is configured to: send a map request to an access gateway (AGW) after receiving said handover request, and said map request carries a line number L1 of line resources used by a target MSC to transmit CS media in the newly established media link, so that after said AGW receives the map request, it relates the line number L1 with the remote media link, and allocates a line number L2 of the line resources which are used to transmit the CS media between the target MSC and the remote user in the newly established media link; and the receiving module is also configured to: receive the line number L2 sent by said AGW via the map response.

Said eMSC also comprises a sending module; wherein:

the sending module is configured to: send a line allocation request to the AGW after receiving said handover request, and the line allocation request carries the line number L1 of the line resources used by the target MSC to transmit the CS media in the newly established media link; and the receiving module is also configured to: send said handover request to the sending module, and receive the line allocation response returned by said AGW to said eMSC, and said line allocation response carries the line number L2 to the line resources used for transmitting the CS media between the target MSC and the remote user in the newly established media link.

The receiving module is also configured to: send said line allocation response to the sending module; and said sending module is also configured to: after receiving said line allocation response, send a map request to said AGW to request the AGW to connect said newly established media link with the remote media link.

Said map request carries the line number L1 or L2.

To sum up, by anchoring the signaling and media of the IMS session, the present invention updates the near end of the media leg when the SRVCC happens while maintains the remote media leg, thus to avoid carrying out update operation on the media of the remote user and to reduce the interruption duration in the call.

PREFERRED EMBODIMENTS OF THE PRESENT INVENTION

The core idea of the present invention is taking the eMSC as the signaling anchor point and the AGW as the media anchor point to establish an IMS session; after the SRVCC happens, the eMSC interacts with the AGW to block the signaling from being transferred by relating to the session, and updating the near end of the original session media leg, and keeping the remote media leg unchanged.

The present invention will be described in detail in accordance with the accompanying figures and the examples.

The First Architecture Example

Figure 4:
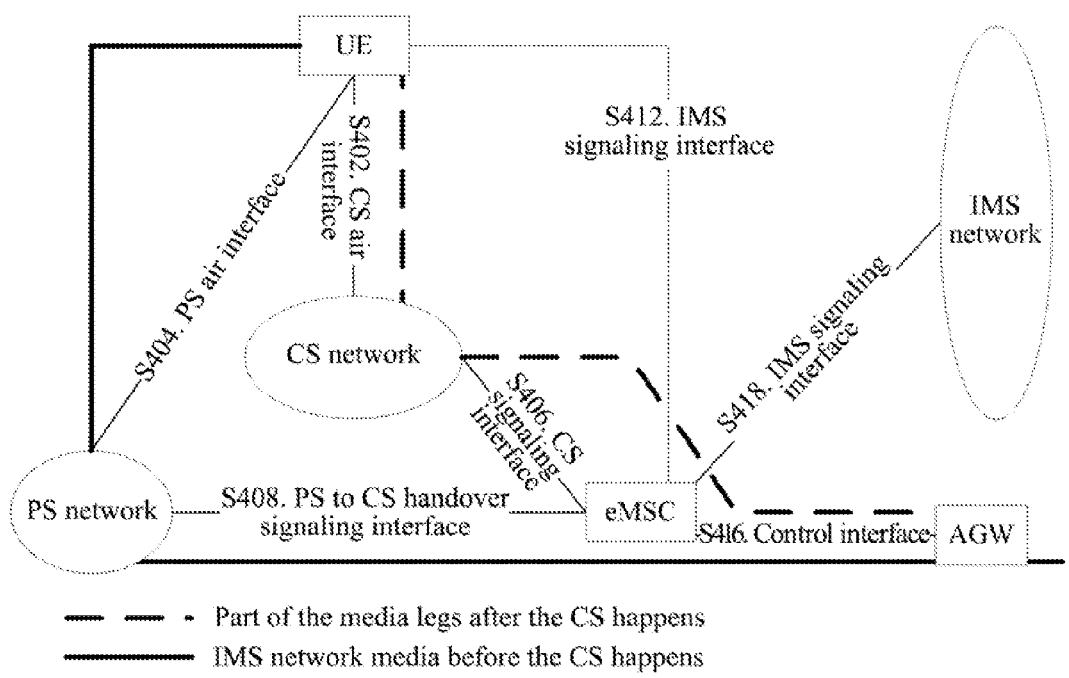
FIG. 4 is a schematic diagram of the first architecture example of the SRVCC in accordance with the present invention.

FIG. 4 is a schematic diagram of the first architecture example of the SRVCC in accordance with the present invention, and FIG. 4 describes each related part or each network element in the network for implementing the SRVCC, as well as the interface or connection relationship between them; the specific description is as follows:

the description of the related network elements:

UE: user terminal equipment having the SRVCC capability;

CS network: a network providing users with the conventional CS services;

PS network: a network providing users with the PS services;

eMSC: used to process the handover request sent by the PS network, and perform the inter-domain transfer of the session, relate the CS handover operation with the inter-domain transfer operation and so on; in this example, the function of IMS control point (ICP) is newly added in the eMSC to work as the signaling anchor point of the IMS session, which is used to control the AGW to allocate resources, carry out map or relate the media leg;

AGW: used as the media anchor point of the IMS session, and used to forward the IP media data or implement the forwarding between the CS media data and the IP media data;

IMS network: a network providing users with the IMS service.

Figure 1:
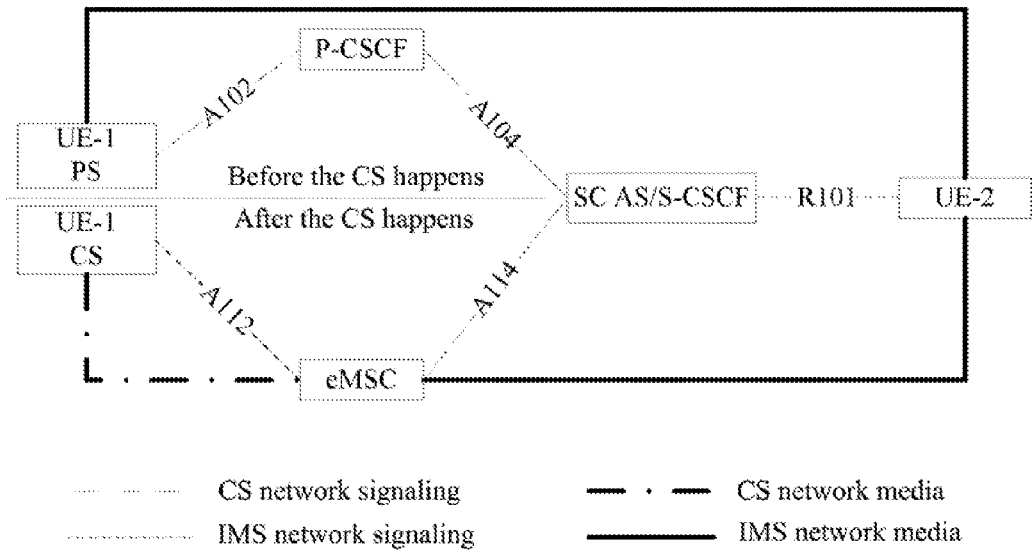
FIG. 1 is a schematic diagram of the SRVCC.
Figure 2:
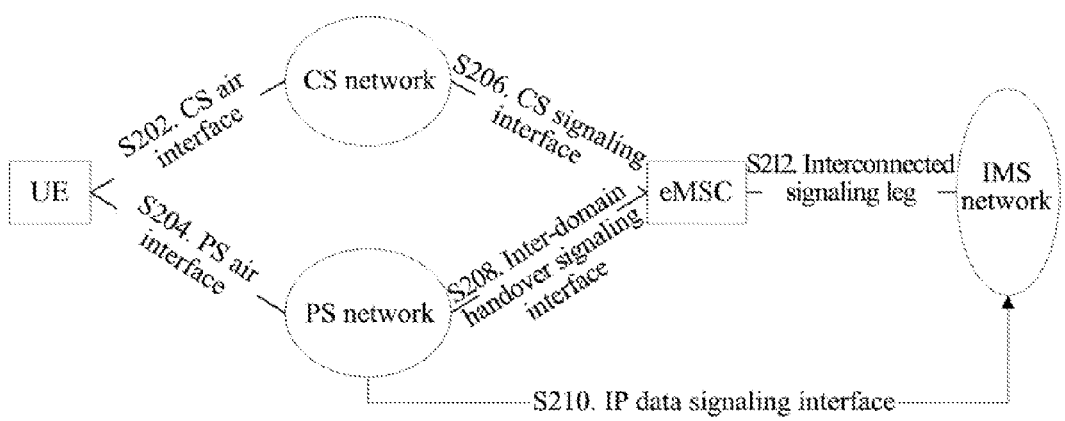
FIG. 2 is an architecture diagram of the existing SRVCC.
Figure 3:
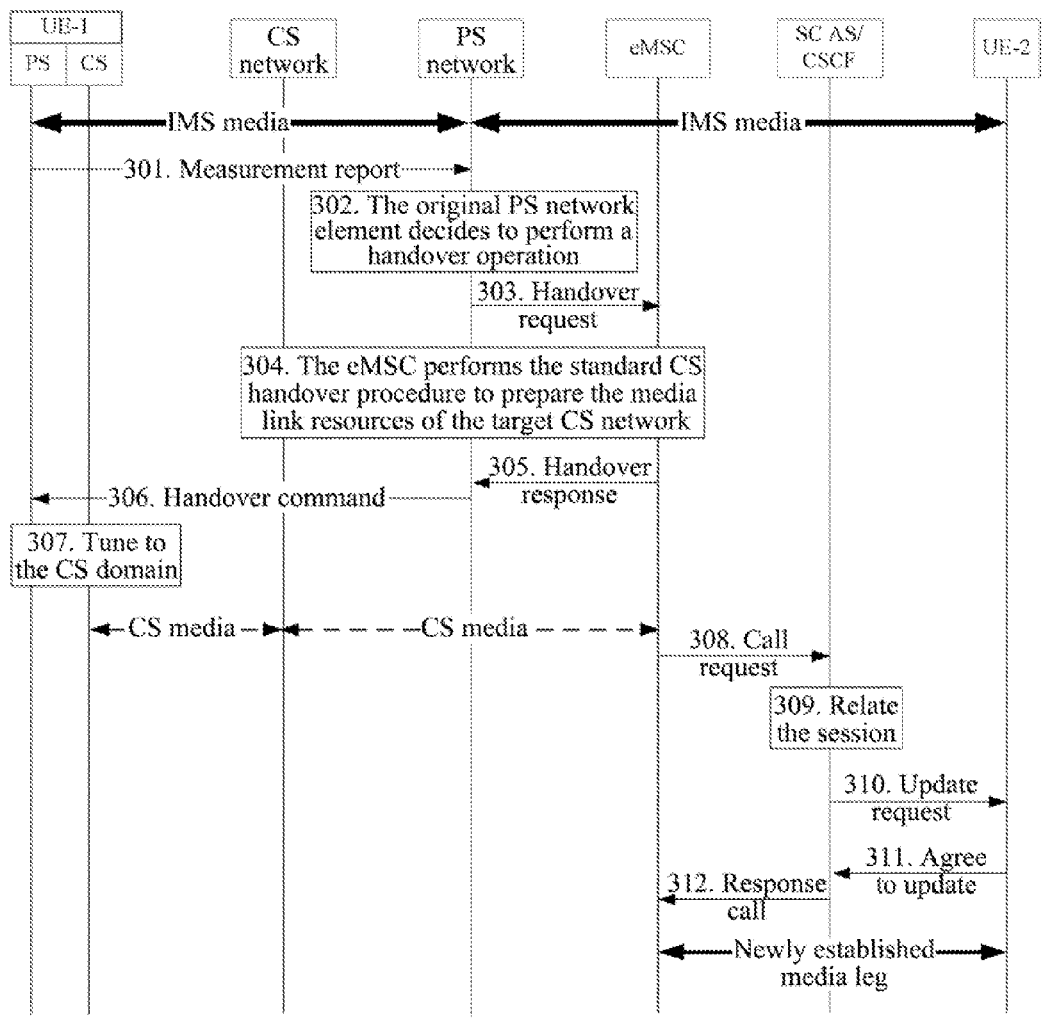
FIG. 3 is a flow chart of the method for implementing the existing SRVCC.

Description of the related interfaces:

S402~S408: the same as S202~S208 in FIG. 2;

S412: the IMS signaling interface between the UE and the eMSC, used to transfer the IMS signaling between the UE and the P-CSCF via the eMSC, such as the standard Gm interface of the IMS;

S416: the signaling interface between the eMSC and the AGW, to make the eMSC control the AGW to allocate resources, carry out map or relate the media leg;

S418: the signaling interface between the eMSC and the IMS network element, used to transfer the IMS protocol message between the UE and the P-CSCF via the eMSC, such as the standard Gm interface of IMS.

The First Flow Example

Figure 5:
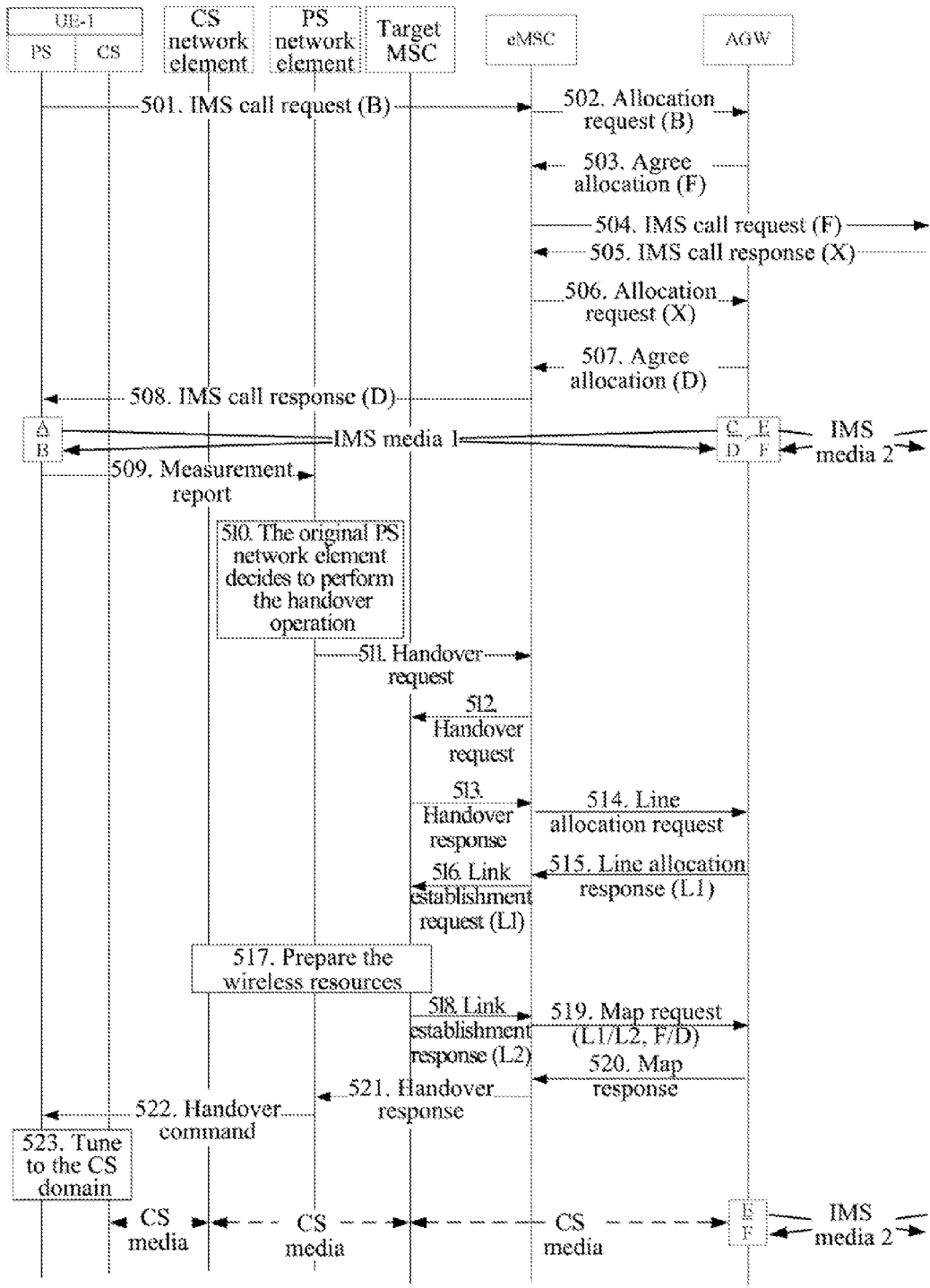
FIG. 5 is a flow chart of the first method of the SRVCC based on the first architecture example in accordance with the present invention.

FIG. 5 is a flow chart of the first method of the SRVCC based on the first architecture example in accordance with the present invention; FIG. 5 describes the process of establishing an IMS session between the UE-1 and the remote end (UE-2), and the process of after the IMS session has been established, SRVCC happening in the UE-1, and how the UE-1 and the network make the UE-1 use the media leg established in the CS domain and maintain the original session continuity; the target cell to which the UE-1 hands over in this example is managed by another MSC (target MSC) instead of the eMSC; the method comprises the following steps:

Step 501: the UE-1 initiates an IMS call request, such as sending an INVITE message, and the call request is born on the IP bearer established in the PS network; the call request carries the transmission address information, denoted as B, used by the UE-1 to receive the media data; the call request is routed to the eMSC which works as the signaling anchor point, and the routing process is not through any IMS network element;

Step 502: the eMSC, working as the signaling anchor point, requests the AGW to allocate the address resources via the S416 interface, such as sending an allocation request message including the transmission address information B;

Step 503: the AGW allocates the port resources C and F, and establishes the association relationship between the port F and the transmission address B so that the media data received from the port F need to be forwarded to the transmission address B; wherein, the port F is used to receive the media data sent by the remote user, and the port C is used to forward the media data received from the port F; and then the AGW indicates to the eMSC that the AGW agrees allocation via the S416 interface, such as sending an allocation response message including the transmission address information of the port F; to simplify description, the transmission address information corresponding to the port F is still denoted as F, and the transmission address information comprises the IP address and the port number;

if the call to be established by the UE-1 comprises more than one media, B comprises the transmission address information used by several UE-1 to receive the media data, and step 502 can have one message, and the message carries transmission address information used by several UE-1 to receive the media data, and step 502 can also have several messages, and each message carries transmission address information used by one UE-1 to receive the media data respectively; correspondingly, step 503 can also have a message carrying the transmission address information of several ports, or several messages carrying the transmission address information of one port respectively, and the specific implementation method does not affect the essence of the present invention.

Step 504: the eMSC saves the transmission address F, and uses the transmission address F to replace the transmission address B of the IMS call request in step 501, and forwards the IMS call request to the remote user;

Step 505: after the remote user receives the IMS call request, it sends an IMS call response, such as a "200 OK" message carrying the transmission address information, denoted as X, used by the remote user to receive the media data;

Step 506: after the eMSC receives the IMS call response, it sends a request for allocating the address resources to the AGW via the S416 interface, such as sending an allocation request message carrying the transmission address information X;

Step 507: the AGW, working as the media anchor point, allocates the port resources D and E, and establishes the association relationship between the port D and the transmission address X so that the media data received by the port D all need to be forwarded to the transmission address X; wherein, the port D is used to receive the media data sent by the UE-1, and the port E is used to forward the media data received by the port D; and then the AGW indicates to the eMSC that the AGW agrees allocation, such as sending an allocation response message carrying the transmission address information of the port D, to simplify description, the transmission address information corresponding to the port D is still denoted as D;

if X comprises the transmission address information used by a plurality of remote users to receive the media data, step 506 can have one message carrying a lot of transmission address information used for receiving the media data, and step 506 can also have several messages, each of which carries one kind of transmission address information for receiving the media data respectively; correspondingly, step 507 might also have one message carrying the transmission address information of several ports, or have several messages, each of which carries the transmission address information of one port respectively, and the specific implementation method does not affect the essence of the present invention.

Step 508: the eMSC saves the transmission address D, and uses the transmission address D to replace the transmission address X in the IMS call response in step 505, and then forwards the IMS call response to the UE-1; the message is sent to the UE-1 by being born on the IP bearer established in the PS network, and the message is not through any IMS network element;

until now, an IMS media leg is established between the UE-1 and the remote user, and the IMS media leg comprises the IMS media leg 1 (simplified as IMS media 1) between the UE-1 and the AGW and the IMS media leg 2 (simplified as IMS media 2) between the AGW and the remote user.

The following is a description of the steps when the UE-1 performs an inter-domain handover.

Step 509: the UE-1 sends a measurement report to the PS network that serves the UE-1 so as to report the signal intensity measurement information of the cells;

Step 510: the PS network that serves the UE-1 judges that the nearby CS network is more suitable to serve the UE-1 according to the signal intensity information of each cell in the measurement report, and decides to perform the handover operation;

Step 511: the corresponding network element, such as the MME, in the PS network sends a handover request to the eMSC, such as sending a handover request message carrying the number information of the UE-1;

Step 512: the eMSC performs the standard CS handover procedure to prepare the media link resources of the target CS network; since the target cell is managed by a different MSC, the eMSC sends a handover request to the target MSC, such as sending a handover request message;

Step 513: the target MSC returns a handover response message, such as a handover response message carrying the interoffice handover number;

Step 514: the eMSC sends the AGW a request via S416 interface for allocating the line resources of the CS media, such as sending a Line Alloc request;

Step 515: after the AGW receives the line resources allocation request, it allocates the line resources for transmitting the CS media, and the corresponding line number is L1, then sends a line allocation response to the eMSC via S416 interface, such as sending a Line Alloc response message carrying the allocated line number L1;

Step 516: the eMSC sends the target MSC a link establishment request in which the abovementioned interoffice handover number is the called number, such as sending an IAM message carrying the information of the line number L1 of the AGW end;

Step 517: the target MSC performs the standard CS interoffice handover process to prepare the wireless resources for the UE-1 (the wireless resources comprise: the line resources used by the target MSC end to transmit media data with the UE-1 via the CS network and transmit media data with the AGW);

Step 518: the target MSC returns an link establishment response to the eMSC, such as sending an ANM message carrying the information of the line number L2 of the line resources used by the target MSC end to transmit the media data with the UE-1 and the AGW via the CS network;

Step 519: the eMSC requests the AGW to perform the map operation, such as requesting the AGW to perform map operation by sending a map request message, and this message carries the line number L2 of the target MSC end as well as the transmission address F of the IMS media leg 2 or the transmission address D of the IMS media leg 1;

until now, a CS media leg identified by both the line numbers L1 and L2 is established between the target MSC and the AGW.

Step 520: the AGW performs the map operation, and relates the media leg between the AGW and the target MSC and identified by the line numbers L1 and L2 with the IMS media leg 2, and sends a map response message to the eMSC via S416 interface, such as sending a Map response message;

Step 521: after the eMSC receives the map response message, it sends a handover response message to said PS network via S408 interface, such as sending a Handover response message;

Step 522: after the PS network receives the handover response message, it sends a handover command message to the UE-1 via S404 interface, such as sending a Handover Command message, to notify the UE-1 to hand over to the CS domain;

Step 523: after the UE-1 receives the handover command message, it tunes the access method to gain access via the CS domain;

until now, a CS media leg is established between the UE-1 and the AGW, and the media leg consists of the CS media leg between the UE-1 and the CS network, the CS media leg between the CS network and the target MSC, as well as the CS media leg (identified by the line number L1 and L2) between the target MSC and the AGW; the AGW relates the newly established CS media leg with the IMS media leg 2 to make the UE-1 continuously communicate with the UE-2.

The Second Architecture Example

Figure 6:
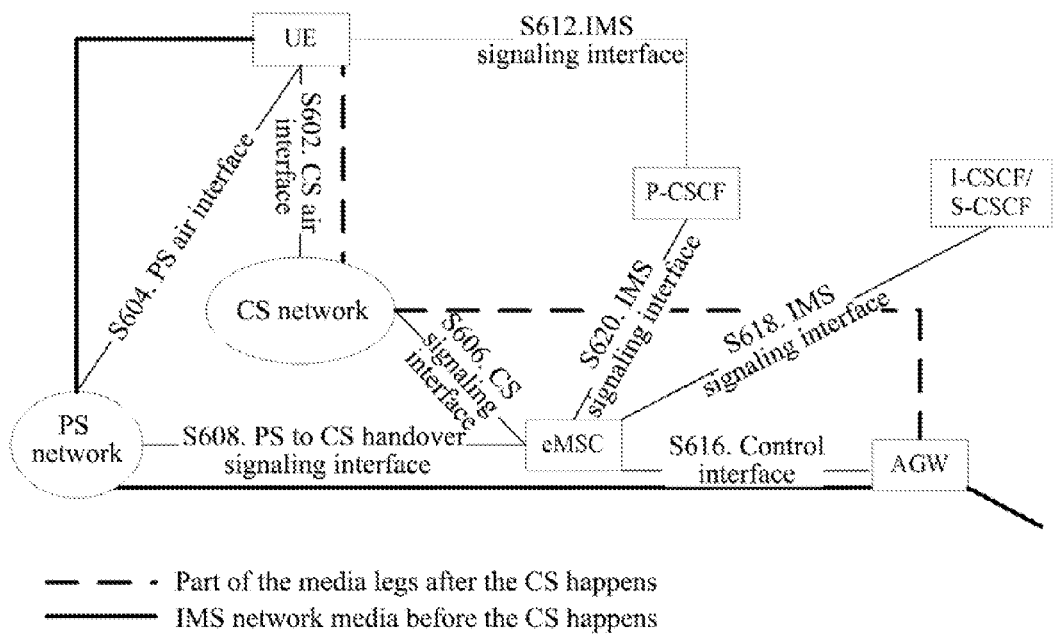
FIG. 6 is a schematic diagram of the second architecture example of the SRVCC in accordance with the present invention.

FIG. 6 is a schematic diagram of the second architecture example of the SRVCC in accordance with the present invention, and FIG. 6 illustrates each related part or each network element in the network for implementing the SRVCC, and the interface or the connection relationship between them; the specific description is as follows:

the description of the related network elements:

UE: user terminal equipment with SRVCC capability;

CS network: a network providing users with the conventional CS services;

PS network: a network providing users with the PS services;

eMSC: used to process the handover request sent by the PS network, perform the inter-domain transfer of the session, and relate the CS handover operation with the inter-domain transfer operation; in this example, the function of IMS control point is newly added in the eMSC as the signaling anchor point of the IMS session and is used to control the AGW to allocate the resources, carry out map or relate the media leg;

AGW: as the media anchor point of the IMS session, used to forward the IP media data or implement forwarding between the CS media data and the IP media data;

IMS network: a network providing users with the IMS services.

Description of the related interfaces:

S602~S608: the same as S202~S208 in FIG. 2;

S612: the IMS signaling interface between the UE and the P-CSCF, used to transfer the IMS signaling between the UE and the P-CSCF, for example, it might be the standard Gm interface of the IMS;

S616: the signaling interface between the eMSC and the AGW makes the eMSC control the AGW to allocate the resources, carry out map or relate the media leg;

S618: the signaling interface between the eMSC and the I-CSCF or the S-CSCF of the IMS, used to transfer the IMS protocol message between the P-CSCF and the I-CSCF or the S-CSCF via the eMSC, for example, it can be the standard Mw interface of the IMS;

S620: the signaling interface between the eMSC and the P-CSCF, used to transfer the IMS protocol message between the P-CSCF and the I-CSCF or the S-CSCF via the eMSC, for example, it might be the standard Mw interface of the IMS;

S618 and S620 form the S418 interface in FIG. 4.

The Second Flow Example

Figure 7:
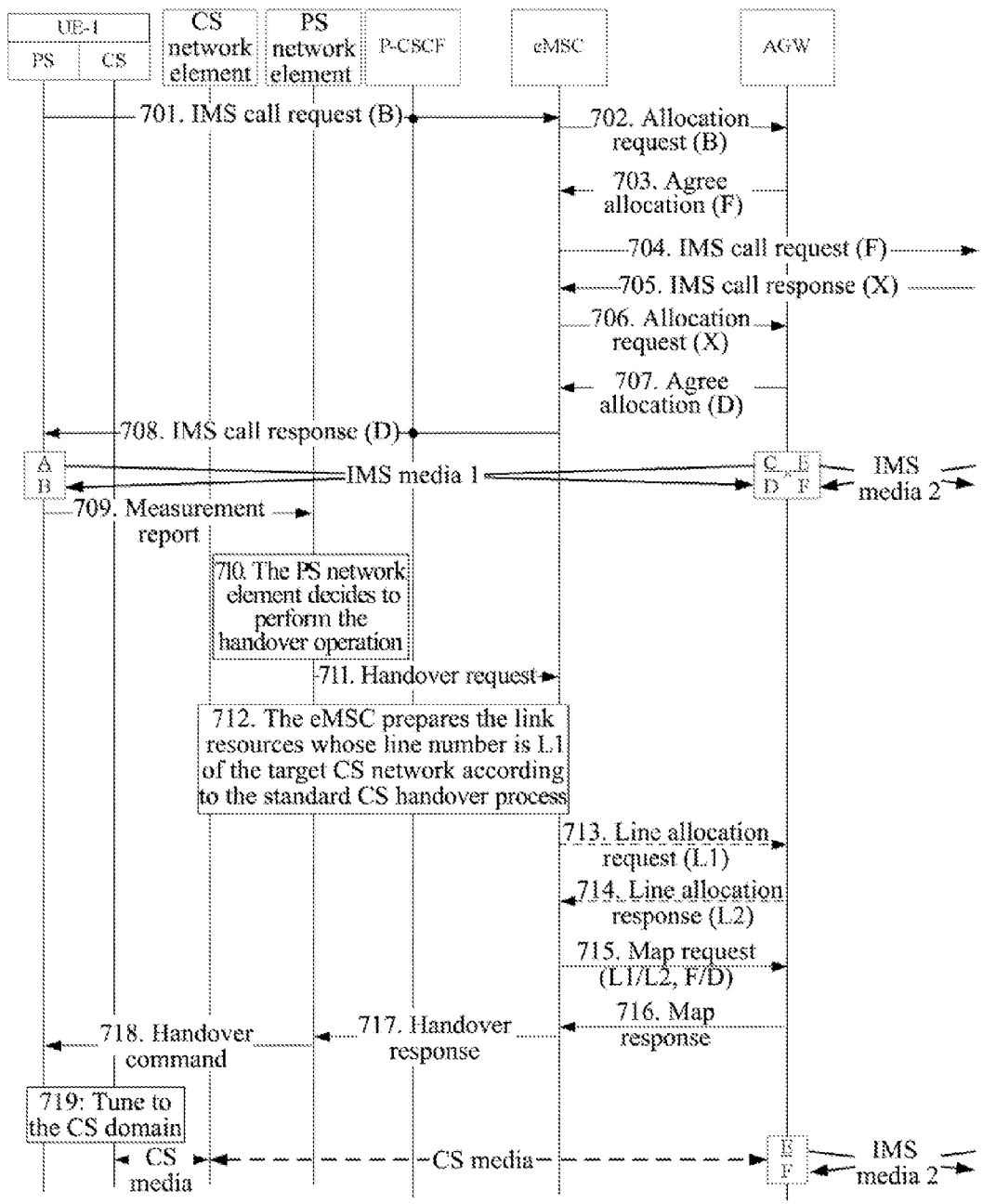
FIG. 7 is a flow chart of the second method of the SRVCC based on the second architecture example in accordance with the present invention.

FIG. 7 is a flow chart of the second method of the SRVCC based on the second architecture example in accordance with the present invention; FIG. 7 describes the process of establishing an IMS session between the UE-1 and the remote end (UE-2), and the process of after the IMS session has been established, the SRVCC happening in the UE-1, and how the UE-1 and the network make the UE-1 use the media leg established in the CS domain and maintain the original session continuity; the target cell to which the UE-1 in this example hands over is managed by the eMSC (that is, the eMSC is the target MSC); the method comprises the following steps:

701~708: similar to steps 501~508, and the difference is that: the IMS message transfer between the UE-1 and the eMSC is through the P-CSCF network element of the standard IMS; that is, in step 701, the PS network sends the IMS call request of the UE-1 to the eMSC via the P-CSCF, and in step 708, the eMSC sends an IMS call response to the UE-1 via the P-CSCF;

the following is the description of the steps when the UE-1 performs an inter-domain handover.

Step 709: the UE-1 sends a measurement report to the PS network that serves the UE-1 to report the signal intensity measurement information of the cells;

Step 710: the PS network that serves the UE-1 judges that the nearby CS network is more suitable to serve the UE-1 according to the signal intensity information of each cell in the measurement report, and decides to perform the handover operation;

Step 711: the corresponding network element, such as the MME, in the PS network sends a handover request to the eMSC, such as sending a handover request message carrying the number information of the UE-1;

Step 712: the eMSC performs the standard CS handover procedure to prepare the media link resources of the target CS network; wherein, the line number of the media link resources of the CS network is L1;

Step 713: after the CS handover procedure has been completed, optionally, the eMSC sends the AGW a request for executing the line allocation operation, such as sending a Line Alloc request message, and the message carries the line number L1 and is sent via the S616 interface;

Step 714: optionally, after the AGW receives the line allocation request, it allocates the line resources for transmitting the CS media, and the corresponding line number is L2, and then a line allocation response is sent to the eMSC via the S616 interface, such as sending a Line Alloc response message carrying the allocated line number L2;

Step 715: the eMSC requests the AGW to perform the map operation, such as sending a Map request message, and the message carries the line number L1, if it performs steps 713~714, the message can also carry the acquired line number L2, and the message also carries the transmission address F of the IMS media leg 2, or the transmission address D of the IMS media leg 1;

Step 716: the AGW performs the map operation, and relates the media leg between the CS network and the AGW and identified by the line numbers L1 and L2 with the IMS media leg 2, and sends a map response message to the eMSC via the S616 interface, such as sending a Map response message;

if steps 713~714 are not performed, before processing the abovementioned map operation, the AGW allocates new line resources used for transmitting the CS media data, and the corresponding line number is L2;

if steps 713~714 are not performed, the abovementioned map response message carries the line number L2, otherwise, the message might not carry the line number L2.

Step 717: after receiving the map response, the eMSC sends a handover response message to the PS network via the S608 interface, such as sending a Handover response message;

Step 718: after the PS network receives the handover response message, it sends a handover command message to the UE-1 via the S604 interface, such as sending a Handover Command message, to notify the UE-1 to hand over to the CS domain;

Step 719: after the UE-1 receives the handover command message, it tunes the access method to gain access via the CS domain;

until now, a CS media leg is established between the UE-1 and the AGW, and the media leg consists of the CS media leg between the UE-1 and the CS network and the CS media leg (identified by the line numbers L1 and L2) between the CS network and the AGW; the AGW relates the newly established CS media leg with the IMS media leg 2 so that the UE-1 can continuously communicate with the UE-2.

Moreover, the present invention also provides an eMSC supporting the SRVCC, and the eMSC comprises:

a receiving module, which is configured to: receive a handover request sent by the packet switch (PS) network to the eMSC to make a request for handing over the IP Multimedia Core Network Subsystem (IMS) session to gain access via said CS network, and send said handover request to a link establishment module; wherein, said IMS session is a session established by user equipment (UE) with the remote user via said PS network and the session is anchored to the eMSC; and a link establishment module, which is configured to: establish a media link, relate the newly established media link with the remote media link of said IMS session, and make the UE communicate with the remote user via said newly established media link and said remote media link.

Said eMSC also comprises a sending module, wherein:
the sending module is configured to: send a map request to an access gateway (AGW) after receiving said handover request, and said map request carries the line number L1 of the line resources used by the target MSC to transmit the CS media in the newly established media link, so that after said AGW receives the map request, it relates the line number L1 with the remote media link, and allocates the line number L2 of the line resources used to transmit the CS media between the target MSC and the remote user in the newly established media link; and the receiving module is also configured to: receive the line number L2 sent by said AGW via the map response.

The sending module is configured to: send a line allocation request to the AGW after receiving said handover request, and the line allocation request carries the line number L1 of the line resources used by the target MSC to transmit the CS media in the newly established media link; and said receiving module is also configured to: send said handover request to said sending module, and receive the line allocation response returned by the AGW to the eMSC, and said line allocation response carries the line number L2 of the line resources used for transmitting the CS media between the target MSC and the remote user in the newly established media link.

The receiving module is also configured to: send said line allocation response to the sending module; and said sending module is also configured to: after receiving said line allocation response, send a map request to said AGW to request the AGW to connect said newly established media link with the remote media link.

Said map request carries the line number L1 or L2.

INDUSTRIAL APPLICABILITY

By anchoring the signaling and media of the IMS session, the present invention updates the near end of the media leg when the SRVCC happens and maintains the remote media leg, thus to avoid carrying out update operation on the media of the remote user and reduce the interruption duration in the call.

What is claimed is:

1. A method for implementing single radio voice call continuity, comprising:
user equipment (UE) establishing an IP Multimedia Core Network Subsystem (IMS) session anchored to an enhanced mobile switch center (eMSC) with a remote user via a packet switch (PS) network;
the PS network sending a handover request to the eMSC to request said IMS session to be handed over to gain access via a circuit switch (CS) network; and
said eMSC receiving said handover request, establishing a media link, and relating a newly established media link with a remote media link of said IMS session, so that the UE can communicate with the remote user via the newly established media link and said remote media link;
said eMSC sending a map request to an access gateway (AGW), and said map request carrying a line number L1 of line resources used by a target mobile switch center (MSC) in the newly established media link to transmit CS media; and
said AGW receiving said map request, and relating the line number L1 with said remote media link, and allocating a line number L2 of the line resources that are used in the newly established media link to transmit the CS media between the target MSC and the remote user, and sending said line number L2 to said eMSC via a map response.

2. The method of claim 1, wherein, after the step of receiving said handover request, said method also comprises:
said eMSC sending a line allocation request to an access gateway (AGW), the line allocation request carrying a line number L1 of line resources used by a target mobile switch center (MSC) to transmit CS media in the newly established media link; and
said AGW receiving said line allocation request and returning a line allocation response to the eMSC, said line allocation response carrying a line number L2 of the line resources used in said newly established media link to transmit the CS media between the target MSC and the remote user.

3. The method of claim 2, further comprising: said eMSC receiving said line allocation response and sending a map request to the AGW to request said AGW to connect the newly established media link with the remote media link.

4. The method of claim 3, wherein:
said map request carries said line number L1 or L2.

5. A system for supporting single radio voice call continuity, comprising:
a packet switch (PS) network, a circuit switch (CS) network, an enhanced mobile switch center (eMSC), and an access gateway (AGW); wherein:
said PS network is configured to: send a handover request to the eMSC to request an IP Multimedia Core Network Subsystem (IMS) session to be handed over to gain access via said CS network; said IMS session is a session established by user equipment (UE) with a remote user via the PS network, and the session is anchored to the eMSC; and
said eMSC is configured to: receive said handover request, establish a media link, and relate a newly established media link with a remote media link of the IMS session, so as to make the UE communicate with the remote user via said newly established media link and said remote media link;
said eMSC is also configured to: after receiving said handover request, send a map request to said AGW, and said map request carries a line number L1 of line resources used by a target mobile switch center (MSC) to transmit CS media in the newly established media link; and
said AGW is configured to: receive said map request, relate said line number L1 with said remote media link, and allocate a line number L2 of the line resources used for transmitting the CS media between the target MSC and the remote user in said newly established media link, and send said line number L2 to the eMSC via a map response.

6. The system of claim 5, wherein, said system also comprises an access gateway (AGW); wherein:
said eMSC is also configured to: after receiving said handover request, send a line allocation request to said AGW, and said line allocation request carries a line number L1 of line resources used by a target mobile switch center (MSC) to transmit CS media in the newly established media link; and
said AGW is configured to: receive said line allocation request, and return a line allocation response to the eMSC, and said line allocation response carries a line number L2 of the line resources used to transmit the CS media between the target MSC and the remote user in said newly established media link.

7. The system of claim 6, wherein:
said eMSC is also configured to: after receiving said line allocation response, send a map request to the AGW to request said AGW to connect said newly established media link with the remote media link.

8. The system of claim 7, wherein:
said map request carries said line number L1 or L2.

9. An enhanced mobile switch center (eMSC) for supporting single radio voice call continuity, comprising:
a receiving module, which is configured to: receive a handover request sent by a packet switch (PS) network to the eMSC to request an IP Multimedia Core Network Subsystem (IMS) session to be handed over to gain access via a circuit switch (CS) network, and send said handover request to a link establishment module;
wherein, said IMS session is a session established by user equipment (UE) with a remote user via said PS network and anchored to the eMSC; and
the link establishment module, which is configured to: establish a media link, and relate a newly established media link with a remote media link of said IMS session, and make the UE communicate with the remote user via said newly established media link and said remote media link;
a sending module is configured to: send a map request to an access gateway (AGW) after receiving said handover request, and said map request carries a line number L1 of line resources used by a target mobile switch center (MSC) to transmit CS media in the newly established media link, so that after said AGW receives the map request, the AGW relates the line number L1 with the remote media link, and allocates a line number L2 of the line resources used to transmit the CS media between the target MSC and the remote user in the newly established media link; and
the receiving module is also configured to: receive the line number L2 sent by said AGW via a map response.

10. The eMSC of claim 9, further comprising a sending module; wherein:
the sending module is configured to: send a line allocation request to an access gateway (AGW) after receiving said handover request, and the line allocation request carries a line number L1 of line resources used by a target mobile switch center (MSC) to transmit CS media in the newly established media link; and
the receiving module is also configured to: send said handover request to said sending module, and receive a line allocation response returned by the AGW to the eMSC, and said line allocation response carries a line number L2 of the line resources used to transmit the CS media between the target MSC and the remote user in the newly established media link.

11. The eMSC of claim 10, wherein:
said receiving module is also configured to: send said line allocation response to the sending module; and
said sending module is also configured to: after receiving said line allocation response, send a map request to said AGW to request the AGW to connect said newly established media link with the remote media link.

12. The eMSC of claim 11, wherein:
said map request carries the line number L1 or L2.

* * * * *